March 15, 1960

S. C. DUDMAN ET AL

2,928,604

INTERPOLATING DEVICES ESPECIALLY FOR THE
CONTROL OF AUTOMATIC MACHINE TOOLS

Filed Oct. 1, 1954

Inventors
S. C. Dudman
C. A. G. LeMay
R. E. Spencer
G. H. Stephenson

By Glascock Downing Seebold
ATTORNEYS

Inventors
S. C. Dudman
C. A. G. LeMay
R. E. Spencer
G. H. Stephenson
By Glascock Downing Seebold
ATTORNEYS

Inventors
S.C. Dudman
C.A.G. LeMay
R.E. Spencer
G.H. Stephenson

ATTORNEYS

United States Patent Office 2,928,604
Patented Mar. 15, 1960

2,928,604

INTERPOLATING DEVICES ESPECIALLY FOR THE CONTROL OF AUTOMATIC MACHINE TOOLS

Sidney Charles Dudman, West Drayton, Christopher Archibald Gordon Le May, Greenford, Rolf Edmund Spencer, West Ealing, London, and Geoffrey Huson Stephenson, Ealing, London, England, assignors to Electric & Musical Industries Limited, Hayes, England, a company of Great Britain Application October 1, 1954, Serial No. 459,814

Claims priority, application Great Britain October 3, 1953

20 Claims. (Cl. 235—197)

This invention relates to the interpolating and also extrapolating device, especially but not exclusively for the control of automatic machine tools.

An automatic machine tool may be required to mill or otherwise shape a workpiece in accordance with a pattern, which may be of arbitrary shape. Considering for example a vertical milling machine in which the milling cutter is rotatable about a fixed vertical axis, one approach to this problem consists in calculating displacements from a predetermined datum (say the axis of the cutter) which the workholder is required to make, to produce the correct dimensions of the workpiece at successive points on the desired pattern, hereinafter termed reference points, and employing the calculated displacements to control the machine. This may be done, for example, by recording the calculated displacements in suitable data records, for example, punched tapes, extracting the recorded information successively as the milling operation progresses, and employing the extracted information for controlling a servo system which in turn controls the component displacements of the machine tool. With such an arrangement, if the pattern is to be followed faithfully, interpolation may be necessary between the stored displacements otherwise the amount of information which needs to be stored may become prohibitive. Furthermore in many cases it is insufficient merely to effect linear interpolation between the reference points, because the number of reference points still needs to be excessive if a curvilinear pattern has to be produced to an acceptable standard of accuracy. On the other hand unless curvilinear interpolation can be carried out with relatively simple apparatus, the cost and bulk of the interpolating device may become prohibitive.

The need for curvilinear interpolation may occur in many other automatic control systems and in computing devices and one object of the present invention is to provide a simple robust device which can effect curvilinear interpolation or in some cases extrapolation.

According to the present invention there is provided an interpolating or extrapolating device comprising at least three input points, at least one output point, at least two transformers inter-connecting said input points and said output point, said transformers having in aggregate the same number of degrees of freedom as there are input points and said transformers having different laws which are predetermined to cause an output signal set up at said output point in response to co-phasal alternating electrical signals applied to said input points to represent the ordinate of a point on a curve determined by the applied signals.

The present invention is based on the principle, which is explained in the following description, that where the number of degrees of freedom of the transformers inter-connecting the input and output points is the same as the number of input points it is possible to set up implicitly the two interpolation co-effects required to produce curvilinear interpolation of a function of one variable. By an extension of the same principle, higher order interpolation can also be produced.

In order that the invention may be clearly understood and readily carried into effect, the invention will be described with reference to the accompanying drawings in which.

Figure 1:
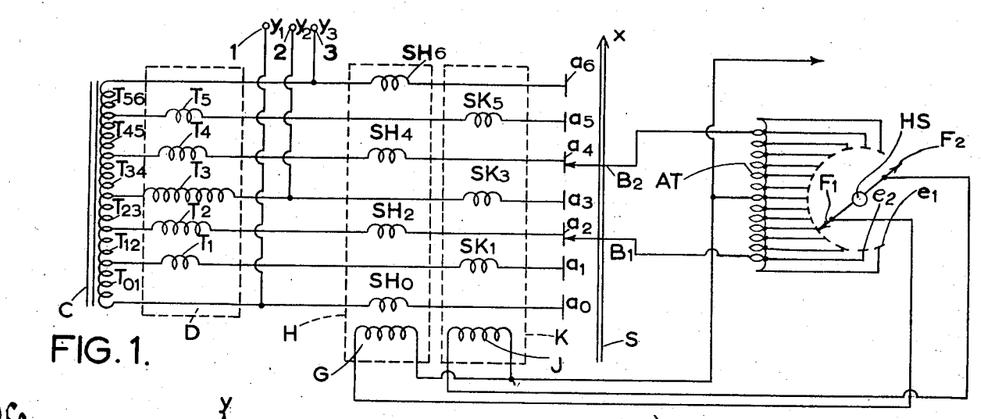
In Figure 1 illustrates one example of an interpolating device in accordance with the present invention, Figures 2a and 2b comprise graphs explanatory of the operation of Figure 1, Figures 3, 4 and 5 illustrate modifications of part of Figure 1.
Figure 2A:
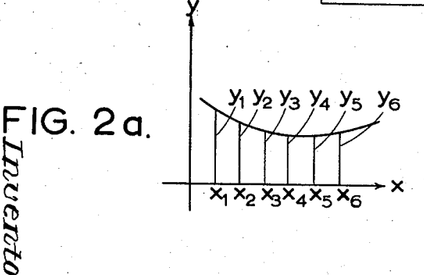

Referring to the drawings, the arrangement illustrated in Figure 1 is an interpolating device suitable for the control of a milling or other machine. For simplicity the description will be confined to the displacement of one element, say the worktable of a milling machine in the $y$ co-ordinate direction, as the worktable is displaced to successive points in another co-ordinate direction, say the $x$ co-ordinate direction, said points being in this case the reference points. The graph in Figure 2a represents the $y$ displacement required for different values of $x$ and it will be assumed that successive discrete values of the displacement $y_1, y_2, y_3 \ldots$ have been calculated for the reference points at which $x$ has the values $x_1, x_2, x_3 \ldots$. The difference in $x$ between successive reference points is arranged to be constant. Let it be represented by $k$. The calculated values of $y$ are recorded in a record of any convenient form, for example a punched tape, and the recorded information is extracted from the record as it is required and fed selectively to the interpolating device which is shown in Figure 1 and the output of which is fed to a servo system which effects the $y$ coordinate displacement. In operation, the interpolating device interpolates values of $y$ between the calculated values $y_1, y_2, y_3 \ldots$ as $x$ takes values intermediate the values $x_1, x_2, x_3 \ldots$ at the reference points, so that the $y$ displacement is accurately controlled for all values of $x$.

Figure 2B:
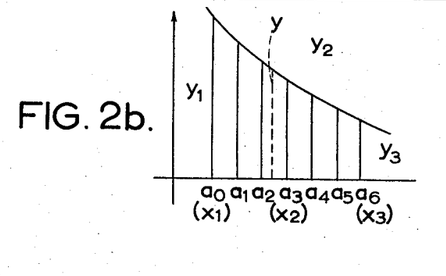

For the purpose of describing Figure 1 it will be assumed that alternating voltages having the same phase and having amplitudes proportional to $y_1, y_2, y_3$ are applied, with reference to ground, to three input terminals 1, 2 and 3 although, as will appear hereinafter, as the milling operation progresses the voltages applied to the terminals 1, 2 and 3 are changed successively. The interpolating device comprises a series of fixed equi-spaced contacts $a_0, a_1, a_2 \ldots$ and although only seven such contacts are shown, in practice the number may be larger. The input terminals 1, 2 and 3 are connected to the contacts $a_0, a_3$ and $a_6$ respectively so that the distance between $a_0$ and $a_3$ represents a change $k$ in $x$, and also the distance between $a_3$ and $a_6$ represents a change $k$ in $x$. The distance between $a_0$ and $a_1$ represents a change $k/3$ in $x$, the distance between $a_0$ and $a_2$ represents a change $2k/3$ in $x$ and so on. The input contacts and the output contacts are interconnected by a series of transformer windings $T_{01}, T_{12}, T_{23} \ldots$ wound on a common core represented by C, and by a second series of transformer windings $T_1, T_2, T_3 \ldots$ wound on a common core represented by the dotted rectangle D. The windings $T_{01}, T_{12}, \ldots$ and the windings $T_1, T_2 \ldots$ therefore constitute two transformers having individual magnetic circuits. There is no winding on the core D connected to contact $a_0$ or connected to the contact $a_6$. The windings $T_{01}, T_{12}, T_{23} \ldots$ have the same number of turns and are formed as shown by a tapped auto-transformer but the windings $T_1, T_2, T_3 \ldots$ are such that the electromotive forces induced across them by a flux variation in the core D have a quadratic relationship. All the windings on the core C are tightly coupled, and similarly the windings on the core D are tightly coupled. Theoretically the coupling factor should be unity in each case and on this assumption, the three alternating voltages $y_1$, $y_2$, $y_3$ injected at the terminals 1, 2 and 3 set up E.M.F.'s at the contacts $a_0, a_1, a_2 \ldots$ representing closely spaced ordinates on a parabolic curve drawn through the points $x_1\ y_1, x_2\ y_2, x_3\ y_3$ (neglecting for the present any additional electro-motive forces induced by windings to the right of D). This state is represented by Figure 2b in which the amplitudes of the electro-motive forces set up at $a_0, a_1, a_2$ etc. are represented by the corresponding ordinates of the parabolic curve shown. The location of $a_0, a_1, a_2$ etc. represent successive discrete values of $x$ in the interval $x_1\ x_3$ and therefore alternating voltages can be derived from contacts $a_0, a_1, a_2 \ldots$ whose amplitudes represent values of the function $y$ produced by quadratic interpolation within the interval $x_1, x_3$. Quadratic interpolation means that any value of $y$ derived from one of contacts $a_0, a_1, a_2 \ldots$ is represented as $$y = y_n + \Delta x \left(\frac{dy}{dx}\right)_n + \frac{\Delta x^2}{2}\left(\frac{d^2y}{dx^2}\right)_n$$

where $y_n$ represents one of the stored values of $y$ (i.e. $y_1, y_2$ or $y_3$), and $\Delta x$ represents the separation of the respective contacts from that contact to which $y_n$ is applied. In the following description it is proposed to make use of this equation in the form $$y = y_2 + \Delta x\left(\frac{dy}{dx}\right)_{x=x_2} + \frac{\Delta x^2}{2}\left(\frac{d^2y}{dx^2}\right)_{x=x_2}$$

with $\Delta x$ varying between $\pm k$. On the assumption made above the distance between $a_0$ and $a_6$ represents a change $2k$ in $x$, say from $x_1$ to $x_3$, and the electro-motive force between the lower end of $T_{01}$ and the upper end of $T_{56}$ has an amplitude representing $y_3 - y_1$, which is equal to $$2k\left(\frac{dy}{dx}\right)_{x=x_2}, \text{ since } \left(\frac{dy}{dx}\right)_{x=x_2} = \frac{y_3 - y_1}{x_3 - x_1}$$

provided $y$ is a quadratic function of $x$ in the interval $x_1, x_3$, which assumption is implicit in the process of quadratic interpolation. Therefore the amplitude of the voltage set up between ground and the left hand end of $T_3$ is $$y_1 + k\left(\frac{dy}{dx}\right)_{x=x_2}$$

The amplitude (say $e$) of the voltage across the winding $T_3$ is then the difference between $$y_2 \text{ and } y_1 + k\left(\frac{dy}{dx}\right)_{x=x_2}$$

Now it has been assumed that $y$ is quadratic, so that $y_1$ can be expressed precisely as $$y_2 - k\left(\frac{dy}{dx}\right)_{x=x_2} + \frac{k^2}{2}\left(\frac{d^2y}{dx^2}\right)_{x=x_2}$$

therefore, the amplitude $e$ represents $$\frac{k^2}{2}\left(\frac{d^2y}{dx^2}\right)_{x=x_2}$$

from right to left along $T_3$ counting positively. Hence if $T_1$ has $n_1$ turns, $T_2$ has $n_2$ turns, etc. all wound in the same sense, then the E.M.F. from $a_1$ to ground is $$y_2 - \frac{2}{3}k\left(\frac{dy}{dx}\right)_{x=x_2} - \frac{n_1}{n_3}e + e$$

For correct interpolation this E.M.F. is required to be $$y_2 - \frac{2}{3}k\left(\frac{dy}{dx}\right)_{x=x_2} + \frac{k^2}{2}\left(\frac{2}{3}\right)^2\left(\frac{d^2y}{dx^2}\right)_{x=x_2}$$

whence $$1 - \frac{n_1}{n_3} = \left(\frac{2}{3}\right)^2$$

or $$\frac{n_1}{n_3} = 1 - \left(\frac{2}{3}\right)^2$$

Similarly $$\frac{n_2}{n_3} = 1 - \left(\frac{1}{3}\right)^2$$

and the ratios $$\frac{n_4}{n_3}$$

and $$\frac{n_5}{n_3}$$

are the same as $$\frac{n_2}{n_3}$$

and $$\frac{n_1}{n_3}$$

respectively. Therefore the first order differential coefficient required for interpolation is set up implicitly by the windings $T_{01}, T_{12} \ldots$ on the core C, and the second order differential coefficient is set up implicitly by the winding $T_3$ on the core D.

There is a linear relationship between the numbers of turns on the windings $T_{01}, T_{12} \ldots$ and the changes in $x$ represented by the distance between the contacts $a_0, a_1 \ldots$, whereas there is a quadratic relationship between the numbers of turns on the windings $T_1, T_2 \ldots$ and the respective changes in $x$, the changes in $x$ being expressed as fractions of $k$.

The interpolating device is, however, also arranged to effect linear interpolation between the values of $y$ represented by the ordinates of $a_0, a_1, a_2 \ldots$ in Figure 2b. This interpolation is referred to herein and in the claims as linear sub-interpolation. The contacts $a_0, a_1, a_2 \ldots$ are scanned by two brushes $B_1$ and $B_2$ spaced apart by a distance equal to twice the contact spacing. The brushes are displaced to represent the value of $x$ and although they are shown as being displaced in a straight line they are mounted on the shaft whose angular displacement represents $x$, the contacts being, correspondingly, angularly disposed about the shaft axis. The shaft is represented in the drawing by the reference S and will be referred to as the slow speed shaft. The two brushes $B_1$ and $B_2$ are of the make before break type and the potential difference set up between the two brushes is applied across an auto-transformer AT, closely spaced taps on which are connected to a series of contacts $e_1, e_2, e_3 \ldots$. These contacts are angularly disposed so as to be scanned by diametrically opposite brushes $F_1$ and $F_2$ mounted on a high speed shaft HS. The shaft HS is geared to the shaft S so that it completes one revolution for each displacement of the brushes $B_1$ and $B_2$ through twice the spacings of the contacts $a_0, a_1, a_2 \ldots$. The contacts $e_1, e_2 \ldots$ subtend an angle slightly exceeding 180° and the brushes $B_1$ and $B_2$ are connected to the taps on auto-transformer AT connected to two of the contacts which are 180° apart. The overlap in the operation of the brushes $F_1$ and $F_2$ provided by the extension of the contacts $e_1, e_2, e_3 \ldots$ beyond the 180° arc allows for uncertainty as to the timing of the change over of $B_1$ and $B_2$ from one contact to another. The brushes $F_1$ and $F_2$ are disposed so that $F_1$ or $F_2$ engages the mid-contact of the auto-transformer AT when the brushes $B_1$ and $B_2$ are at the mid-point of contacts in the series $a_0, a_1, a_2 \ldots$. The potential difference set up between the brush $F_1$ and the midpoint of AT is applied to the primary winding G of a transformer whose core is represented by the rectangle H. Similarly the potential difference set up between brush $F_2$ and the midpoint of AT is applied to the primary winding J of a transformer whose core is represented by the dotted rectangle K. The transformer core H carries a system of secondary windings $SH_0$, $SH_2$, $SH_4$ . . . each having the same number of turns, inserted in the leads to the even-numbered contacts $a_0$, $a_2$ . . . . Similarly the transformer winding K has a system of secondary windings $SK_1$, $SK_3$, $SK_5$ in the leads to the odd-numbered contacts $a_1$, $a_3$ . . . . The step down ratio of 2:1 in the transformers G and H is required because the linear sub-interpolating components act over the range $$\pm \frac{1}{2}(x_{a_{n+1}} - x_{a_n})$$

even though the auto-transformer AT is connected to contacts $$\pm (x_{a_{n+1}} - x_{a_n})$$

apart.

Assume that brushes $B_1$ and $B_2$ are engaging $a_2$ and $a_4$ and the brush $F_1$ is scanning the contact series $e_1$, $e_2$, $e_3$ . . . . The displacement of $F_1$ from the mid-contact of the series represents the departure of $x$ from the discrete value represented by $a_3$. This is denoted by $\partial x$. The voltage applied across AT is the difference between $y$ at $a_4$ and $y$ at $a_2$ (Figure 2b) and the voltage applied to the transformer primary winding G represents the product of this last difference and $\partial x$. Half of this product is added to the voltages picked-off from $a_2$ and $a_4$ and the actual voltage at the mid-point of AT is therefore that represented by the ordinate $$\frac{a_2 + a_4}{2}$$

which is approximately equal to $a_3$ in Figure 2b plus an increment obtained by linear interpolation in the range $$\frac{x_{a_2} + x_{a_3}}{2}$$

to $$\frac{x_{a_3} + x_{a_4}}{2}$$

Moreover at the time when the brushes $B_1$ and $B_2$ are about to change from $a_2$ to $a_3$ and from $a_4$ to $a_5$ respectively, $F_1$ and $F_2$ are both injecting current into the winding G and J and the contacts $a_2$ and $a_3$ on the one hand and $a_4$ and $a_5$ on the other hand are brought to substantially the same potential. The brushes $B_1$ and $B_2$ may therefore be of the make-before-break type to avoid interruptions in the output voltage.

Summarising the arrangement shown in Figure 1, terminals 1, 2 and 3 constitute three input points which are interconnected by the primary turns of two transformers, one comprising the windings $T_{01}$ . . . $T_{56}$ and the other comprising the windings $T_1$ . . . $T_5$. The transformers have the same number of degrees of freedom as there are input points, namely three and namely the potential gradient of the first transformer, the potential gradient of the second transformer and the mean potential of the transformers, the mean potential being only a single degree of freedom since the windings of both transformers are connected for direct current. The expression "degrees of freedom" signifies the least number of electrical variables, for example the potential and potential gradient, which for the particular arrangement of transformers under consideration, must be given definite values before the electric state of the arrangement is completely determined. The three degrees of freedom in the arrangement shown in Figure 1 are constrained on the application of alternating electrical signals to the input points 1, 2 and 3 since such signals will determine the potential gradient on each transformer and also the mean potential of the transformers. There is a connection from the input point 1 through half of the auto-transformer $T_{01}$ . . . $T_{56}$ to the input point 2 and similarly there is a connection from the input point 2 to the input point 3 through the other half of the auto-transformer and the input points represent three reference abscissae on any curve represented by input signals applied to the input points 1, 2 and 3. The relative spacing of the reference abscissae represented by the input points is determined by the number of turns of the auto-transformers $T_{01}$ . . . $T_{56}$ included in the respective connections between the input points. The amplitudes of the input signals represent ordinates of a desired curve, and selection of these ordinates so that the corresponding abscissae have the correct relative spacing, automatically produces a voltage across the primary turns of the other transformer, namely the winding $T_3$, the amplitude of which is proportional to the second derivative of the curve, or more correctly the second derivative of the function which specifies the curve with reference to the particular coordinate system employed. The primary turns $T_3$ of the other transformer $T_1$ . . . $T_5$ are in the case of Figure 1 common to the connection from the input point 1 to the input point 2 and to the connection from the input point 2 to the input point 3. The contacts $a_0$ . . . $a_6$ constitute output points or terminals and there are output connections from the input points to the output points, which output connections selectively include secondary turns of the transformer $T_{01}$ . . . $T_{56}$ and the transformer $T_1$ . . . $T_5$ although for purposes of analysis, as shown above, it is convenient to consider the output connections from the output points to only one input point, namely the point 2. Furthermore the transformer turns which are traversed in passing from an output point to a selected input point are regarded as secondary turns of the transformers although clearly the same turns in some cases are also primary turns particularly as the transformer $T_{01}$ . . . $T_{56}$ is an auto-transformer. The output points $a_0$ . . . $a_6$ represent a series of spaced abscissae, the spacing being determined by tappings on the auto-transformer $T_{01}$ . . . $T_{56}$ to which they are connected, and since the tappings are equi-spaced the abscissae represented are equi-spaced. Thus, the number of secondary turns of the transformer $T_{01}$ . . . $T_{56}$ in the output connections have a linear relationship to the spacings of the corresponding abscissae from the reference abscissae, say from the reference abscissa represented by input point 2, whereas the numbers of secondary turns of the transformer $T_1$ . . . $T_5$ in the output connections have a non-linear, and namely a quadratic relationship, to the corresponding spacings. The brushes $B_1$ and $B_2$ constitute selector means displaceable to represent desired abscissa values, the brushes $B_1$, $B_2$ engaging different contacts $a_0$ . . . $a_6$ in successive ranges of displacement, each range representing a small range of $x$. Linear sub-interpolation of the output is produced by linearly varying the output signal with the displacement of the brushes $B_1$, $B_2$ in each of said ranges. The transformers therefore determine the kind of curve which is generated by the electromotive forces set up at the output points and also the axis of the curve, whereas the input signals determine the location of the curve and its scale.

Figure 3:
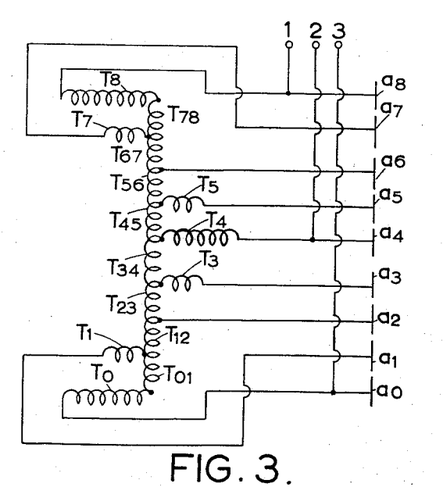
Figure 4:
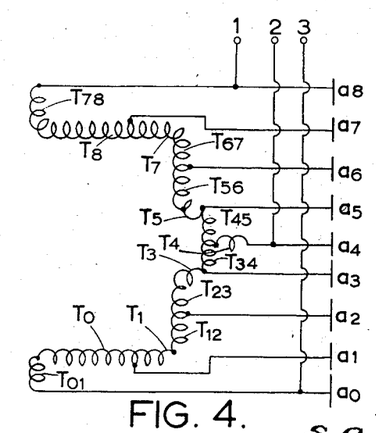
Figure 5:
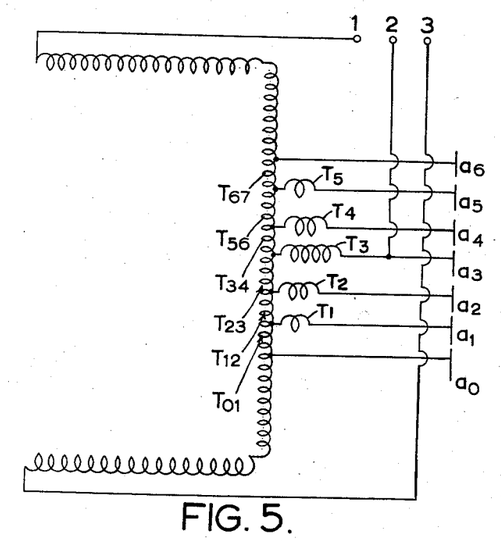

Figures 3, 4 and 5 illustrate modified arrangements which may be adopted for the two systems of transformer windings which produce quadratic interpolation. In all these figures the winding portions of the two transformers are denoted by a system of references similar to that used in Figure 1. Thus the windings $T_{01}$, $T_{12}$ . . . comprise one transformer and the numbers of turns of these windings are linearly related to the spacing of the respective contacts $a_0$, $a_1$ . . . one from another. Similarly the windings $T_1$, $T_2$ . . . comprise the second transformer and the number of turns of these windings are quadratically related to the spacing of the respective contacts $a_0$, $a_1$ . . . one from another. Figure 3 differs from Figure 1 only in that some of the windings in the quadratic series are wound in opposite senses from others, and those windings in the quadratic series which are wound in one sense are shown disposed to one side of the linear series of windings, and the windings in the quadratic series which are wound in the opposite sense are shown disposed on the other side of the linear series of windings. Taking account of the sense of the windings, the turns ratios of the windings $T_1$, $T_2$ . . . can easily be evaluated, to give the required quadratic interpolation as in Figure 1. Figure 3 is similar to Figure 2 as regards the transformer comprising the windings $T_1$, $T_2$ but these windings are disposed selectively between the windings $T_{01}$, $T_{12}$ . . . which comprise the linear transformer. Figure 5 is a modification of Figure 2 in which interpolation is provided over only half the total span of the linear transformer. In Figures 3, 4 and 5 no provision is shown for linear sub-interpolation by injecting voltages into the leads to the contacts $a_0$, $a_1$, $a_2$ . . . . . This provision may of course be made if desired.

It will be understood that in Figure 3, some primary turns of the second transformer $T_1$ . . . $T_5$ are included in the connection from the input point 1 to the input point 2 and other primary turns thereof are included in the connection from the input point 2 to the input point 3. The same is true of Figure 4 but in this case the second transformer is also an auto-transformer and it and the linear auto-transformer $T_{01}$ . . . $T_{56}$ are both divided into sections and the sections of the two auto-transformers are alternated in the connections.

In evaluating the quadratic transformer for the arrangements shown in Figures 3, 4 and 5, the turns ratios of the windings can be derived by an extension of the theory given in the arrangement of Figure 1, bearing in mind that the tapping points on the linear transformer correspond to equi-spaced points on a chord. The electromotive forces required on the quadratic windings must therefore correspond to the "lifts" required to move from the chord to the curve in a direction parallel to the axis of the curve.

Figures 6, 7, 8:
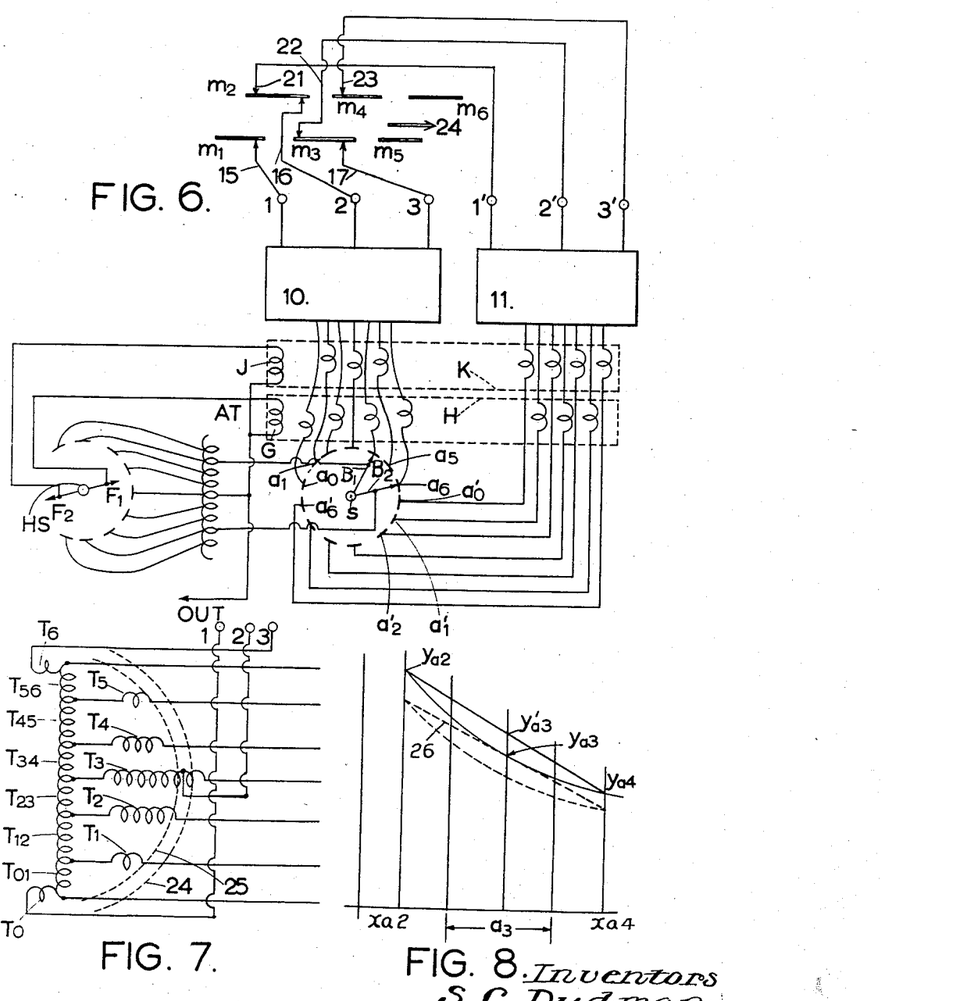
Figure 6 illustrates an addition to Figure 1 for covering successive ranges of the variable.
Figure 7 illustrates a modification of part of Figure 1.
Figure 8 is a graph explanatory of Figure 7.

Figure 6 illustrates a preferred arrangement in which to facilitate switching of the voltage representing the calculated values of $y$, two parabolic interpolating devices are employed alternately, and have a common linear sub-interpolating circuit. In this figure, the rectangles 10 and 11 represent two identical quadratic interpolating devices of the construction shown in Figure 5. The two devices are associated with a single slow speed shaft S on which are mounted two brushes $B_1$ and $B_2$ as in Figure 1. These brushes scan a circular track in which the contacts $a_0$, $a_1$ . . . $a_6$ of the device 10 occupy one semi-circle and the corresponding contacts of the device 11 occupy the other semi-circle, the latter contacts being denoted by $a'_0$, $a'_1$ . . . $a'_6$. The input terminals of the device 10 are denoted by references 1, 2 and 3 and those of the device 11 by references 1', 2' and 3'. The input terminals 1, 2 and 3 are connected to selector brushes 15, 16 and 17 and the input terminals 1', 2' and 3' are connected to a second group of selector brushes 21, 22 and 23. The selector brushes 15, 16, 17 and 21, 22, 23 are mounted on a single shaft and scan, in the direction indicated by the arrow 24, a series of contacts $m_1$, $m_2$, $m_3$ . . . $m_6$ staggered as shown so that the odd numbered contacts are scanned by the brushes 15, 17 and 22 and the even-numbered contacts are scanned by the brushes 21, 16 and 23. The contacts $m_1$ to $m_6$ are angularly disposed about the axis of the shaft carrying the brushes, but for convenience of illustration the contacts are shown arranged in lines and the shaft for the brushes is omitted. As successive discrete values of $y$ are extracted from the record, corresponding voltage analogues are applied to the respective contacts of the series $m_1$, $m_2$, $m_3$ . . . Thus, $y_1$ is applied to $m_1$, $y_2$ is applied to $m_2$, and so on. The shaft S is geared to the shaft carrying the six selector brushes 15, 16, 17 and 21, 22, 23 in such a way that the shaft S makes one revolution whilst the six selector brushes traverse a distance equal to the separation between the centres of the adjacent contacts in the same row, $m_1$ to $m_3$ for example. The voltage analogues are taken into service three at a time, and while any three analogues are in service, the next value of $y$ is extracted from the record, is set up as a voltage analogue and applied to the next contact $m_4$, and so on in advancing sequence. Evidently temporary storage facilities are required for the voltage analogues. Usually moreover it is preferable to record the value of $y$ in the record in a binary digital code form, and in this case the conversion to analogue form and the temporary storage of the analogues can, conveniently, be effected by apparatus such as described in copending United States patent application Serial No. 459,794 filed on October 1, 1954 by Stephenson et al. The output $y$ is therefore derived from the interpolating device 10 over the interval of $x$ from midway between $x_1$ and $x_2$ to midway between $x_2$ and $x_3$, and the output of $y$ is derived from 11 from mid-way between $x_2$ and $x_3$, to mid-way between $x_3$ and $x_4$, and so on. The linear sub-interpolation is carried out by a circuit similar to that used in Figure 1 and corresponding parts bear the same reference numerals.

In the arrangement of Figure 6, during the times when the brushes $B_1$ and $B_2$ change from the semi-circle of studs $a_0$ . . . $a_6$ to the semi-circle of studs $a'_0$ . . . $a'_6$, equal electromotive forces are applied to the contacts $a_6$ and $a'_0$ by the devices 11 and 12 respectively. This means that the two contacts correspond to the same small range of $x$ and this has to be allowed for in arranging the contacts, for example by arranging that each of the contacts $a_6$ and $a'_0$ is effective over half the range, a similar arrangement being made in the case of the contacts $a'_6$ and $a_0$.

Instead of employing a series of contacts $m_1$, $m_2$, $m_3$ . . . as indicated, four angularly disposed contacts would suffice cyclically scanned by the six brushes. In this case while the device 11 is in use, the voltage analogue representing $y_1$ would be cleared from the contacts $m_1$ and replaced by voltage analogues representing $y_5$, and so on.

The devices illustrated in Figures 1, 3 and 4 can of course also be employed to give outputs over only half the interval covered by the input signals.

Instead of deriving the output from one quadratic interpolating device from mid-way between $x_1$ and $x_2$ to mid-way between $x_2$ and $x_3$ and then from the other to mid-way between $x_3$ and $x_4$ and so on, as in Figure 6, one device may be arranged to cover the interval $x_1$ to $x_2$, the next from $x_2$ to $x_3$, and so on. The quadratic interpolating devices of Figures 1, 3 and 4 are also suitable for use in this case, half the "a" contacts being omitted.

It will be appreciated that in Figure 1, and also in Figure 6, linear sub-interpolation is effected in such a way that the output over the range of $x$ covered by any contact, say $a_3$, represents the mid-ordinate of a chord joining values of $y$ set-up by the adjacent contacts. This is illustrated in Figure 8 which shows that when $B_1$ and $B_2$ are at the mid-points of contacts $a_2$ and $a_4$, the output represents the ordinate $y'_{a3}$. Since the correct output is $y_{a3}$ the method of linear sub-interpolation adopted introduces a minor error, but this can be corrected, as indicated in Figure 7 by modifying the electromotive forces injected into the leads by the quadratic interpolation windings $T_1$, $T_2$ . . . and by adding further windings $T_0$ and $T_6$ so as to produce a parabolic curve such as indicated by the dotted line in Figure 8. In other respects the arrangement illustrated in Figure 7 is identical with that illustrated in Figure 1. The modification of the quadratic interpolation windings modifies the values of $y$ set up at the contacts $a_2$ and $a_4$ so that the mid-point of the chord joining corresponding points on $a_2$ and $a_4$ is tangent to the true parabolic curve as represented by the dotted chord in Figure 8. To achieve this result, the number of turns on the windings $T_1, T_2, T_3 \ldots$ in the leads to the contacts $a_0, a_1, a_2 \ldots$ is reduced, without altering the points to which the input signals $y_1, y_2, y_3$ are injected. Since in the case of Figure 1 there is no parabolic winding in the leads to $a_0, a_6$ negative windings are now required, that is windings having reverse polarities compared with the others and these are constituted by the windings $T_0$ and $T_6$ above referred to. In Figure 7 the dotted curve 24 represents the parabola drawn through the points $y_1, y_2, y_3$ whilst the dotted curve 25 represents the parabola drawn through the values represented by the electromotive forces set up on the contacts $a_0, a_1, a_2 \ldots$. The modification of the electromotive forces injected into the leads to the contacts $a_0, a_1, a_2 \ldots$ is required to introduce a correction proportional to $$\frac{1}{2}\left(\frac{x_{a_1}-x_{a_2}}{2}\right)\left(\frac{d_2y}{dx^2}\right)_{x=x_{a_3}}$$

which in this example equals $$\frac{1}{2}\left(\frac{k}{3}\right)^2\left(\frac{d^2y}{dx^2}\right)_{x=z_2}$$

and is constant. The numbers of turns of the windings $T_1, T_2 \ldots$ retains a quadratic relationship with the respective changes in $x$, as indicated above, but there is a modification of the constant term in the relationship. It will of course be appreciated that the other forms of quadratic interpolating devices shown in Figures 3 to 5 can be modified in the same way.

Figure 9:
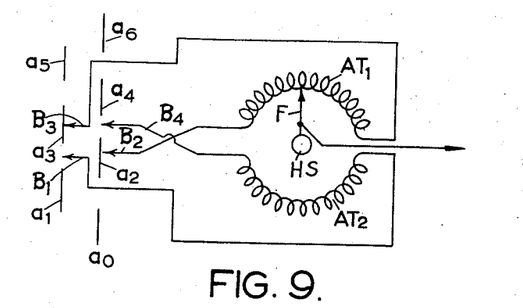
Figure 9 is another modification of Figure 1.

Figure 9 shows an alternative way for providing for linear interpolation between the discrete values of $y$ obtained by quadratic interpolation. In this modification the contacts $a_0, a_1, a_2 \ldots$ are staggered so that the even-numbered contacts are in one row and the odd-numbered contacts are in another row. The shaft S carries four brushes $B_1, B_2, B_3, B_4$ the brushes $B_1$ and $B_3$ scanning the odd numbered contacts and the brushes $B_2$ and $B_4$ scanning the even-numbered contacts. The high speed shaft HS carries a single brush F and it makes one half revolution whilst the four brushes $B_1, B_2, B_3, B_4$ travel a distance equal to the spacing of the contacts $a_0, a_1, a_2$, etc. The brush F alternately scans two auto-transformers $AT_1$ and $AT_2$ and the potential difference between the brushes $B_2$ and $B_3$ is applied across the auto-transformer $AT_1$ whilst the potential difference between the brushes $B_1$ and $B_4$ is applied across the auto-transformer $AT_2$. The auto-transformers $AT_1$ and $AT_2$ are therefore employed for linear sub-interpolation during the scanning of alternate contacts of the series $a_0, a_1, a_2 \ldots$ and while one of the auto-transformers is in use in bridging the two adjacent contacts the other is "leap-frogging" from the pair of contacts which has just been traversed over the pair now being traversed. In this case the transformers H and K are not required and the output is obtained directly from the brush F.

Although the invention has been described with reference to milling machines in which the displacements are defined in terms of Cartesian co-ordinates it will be understood that the invention may be applied where the displacements are defined in terms of other co-ordinates, for example, cylindrical co-ordinates. The invention can moreover be applied to other machines where it is desired to cut or otherwise shape a workpiece automatically under the control of instructions relating only to discrete reference points. The invention is, furthermore, not limited in its application to the control of automatic machines but can be applied to computing devices in general.

Moreover, further series of transformer windings, analogous to $T_1, T_2, T_3 \ldots$ can be inserted in the leads to the contacts $a_1, a_2, a_3 \ldots$ to produce cubic, and other interpolation. In that case it is necessary to feed a correspondingly greater number of signals representing values of $y$ to appropriate injection points. If additional windings are employed each additional transformer introduces an additional degree of freedom so that an additional input signal must be applied. Quadratic and other interpolation such as indicated is herein and in the claims referred to generically as curvilinear interpolation, since in general it involves fitting a curve to a series of at least three reference points or constraints.

The device can also be arranged, if desired, to extrapolate. This can readily be seen, for example, by assuming that in Figure 3, the input signals are applied to the contacts $a_2, a_4$. The contacts $a_0, a_1, a_7$ and $a_8$ would then correspond to extrapolated points. Moreover, by consideration of Figure 7 it is apparent that the input signals need not represent points lying on the curve generated by the output signals, although of course the location of the curve must be determined by the input signals.

The arrangements shown are not critical with regard to the frequency of the applied signals, and the signals need not be sinusoidal provided they include alternating components.

What we claim is:

1. An interpolating or extrapolating device comprising three input points, a first transformer, a connection including some primary turns of said transformer from one of said points to a second of said points, another connection including other primary turns of said transformer from said second point to the third input point, to cause said points to represent three reference abscissae of a curve, a series of output points representing equi-spaced abscissae of said curve, a second transformer having primary turns in one at least of said connections to produce a potential gradient across the primary turns of said second transformer proportional to the second derivative of a curve determined by alternating signals applied to said input points, and output connections from said second input point to said output points one to each output point, said output connections selectively including secondary turns of said first and second transformers, and the numbers of secondary turns of said first transformer in said output connections having a linear relationship to the spacing of the corresponding abscissae from the intermediate reference abscissae and the number of secondary turns of said second transformer in said output connections having a quadratic relationship to the spacing of the corresponding abscissae from the intermediate reference abscissa, to produce alternating signals at said output points having amplitudes representing ordinates of points on a curve determined by the transformers and by the amplitudes of signals applied to said input points.

2. A device according to claim 1 comprising selector means movable to traverse said output points to represent a desired abscissa, whereby an output signal can be selected from one of said output points.

3. An interpolating device comprising an auto-transformer, three input points, a connection including half the primary turns of said auto-transformer from one of said input points to a second of said input points, another connection including the other half of the primary turns of said auto-transformer from said second point to the third input point, to cause said points to represent three reference abscissae of a curve with the intermediate abscissa midway between the other two abscissae, a series of output points, a second transformer having primary turns in one at least of said connections to produce a potential gradient across said primary turns proportional to the second derivative of a curve determined by alternating signals applied to said input points, and output connections from taps on said auto-transformer to said output points one for each output point, said taps being uniformly spaced to cause said output points to represent equi-spaced abscissae, said output connections selectively including secondary turns of said second transformer and the numbers of secondary turns of said second transformer having a quadratic relationship to the spacing of the corresponding abscissae from the intermediate reference abscissa, to produce alternating signals at said output points having amplitudes representing ordinates of points on a curve determined by the transformers and by the amplitudes of signals applied to said input points.

4. A device according to claim 3, the primary turns of said second transformer being common to the connection from said first input point to said second input point and to the connection from said second input point to said third input point.

5. A device according to claim 3, some primary turns of the second transformer being included in the connection from said first input point to said second input point, and other primary turns of said second transformer being included in the connection from said second input point to said third input point.

6. A device according to claim 3, primary turns of said second transformer being selectively connected between different sections of said auto-transformer.

7. A device according to claim 3 comprising selector means movable to traverse said output points to represent a desired abscissa, whereby an output signal can be selected from one of said output points.

8. An interpolating arrangement comprising in combination two devices according to claim 1, selector means common to the output points of said devices, means for causing said selector means to traverse the output points of said devices alternately to represent successive abscissae, and switch means synchronised with said selector means for applying input signals three at a time to the input points of said devices alternately.

9. An interpolating arrangement comprising in combination two devices according to claim 3, the taps on the auto-transformers of said devices being predetermined to cause the respective output points to represent abscissae in the range from midway between the first and second reference abscissae to midway between the second and third reference abscissae, selector means common to the output points of said devices, means for causing said selector means to traverse the output points of said devices alternately to represent successive abscissae, regularly spaced input sources of signals for said devices, a first group of three selectors connected to the input points of one of said devices and spaced to engage three successive signal sources, a second group of three selectors connected to the input points of the other of said devices and spaced to engage three successive signal sources, and means for displacing said groups of selectors in synchronism with said common selector means, the disposition of said groups of selectors being predetermined in relation to said common selector means to apply signals from first, second and third sources to one of said devices as the common selector means traverses the corresponding output points, and to apply signals from second, third and fourth signal sources to the alternate device as the common selector means traverses the alternate output points and so on.

10. A device according to claim 1 comprising a series of regularly arranged switch contacts connected to said output points, selector means movable to engaged said contacts selectively to represent successive abscissae, means for deriving an output signal from said selector means, and means for varying said output signal while said selector means remains in engagement with each of said contacts, to produce sub-interpolation of said output signal.

11. A device according to claim 1 comprising a series of regularly spaced contacts connected to said output points at least one pair of selectors spaced to engage different contacts of said series and displaceable to represent successive abscissae, means for deriving an output signal from said pair of selectors, a variable transformer, means for applying the difference signal set up between said pair of selectors across the primary turns of said variable transformer, means for varying the transformation ratio of said transformer whilst said selector pair remains in engagement with any two contacts to set up an incremental signal across secondary turns of said transformer, and means for injecting said incremental signal in the output signal to produce sub-interpolation.

12. A device according to claim 11 said injecting means comprising transformer means for injecting incremental signals into connections to the respective contacts.

13. A device according to claim 11, said injecting means comprising means connecting the secondary turns of said variable transformer in series with said output connections consecutively.

14. An interpolating or extrapolating device adapted to receive plural alternating current signals whose amplitudes define numerical values of a function for different values of an argument, and to provide an alternating current output signal whose amplitude represents at least an approximation to the numerical vlaue of said function for other values of said argument, said device comprising at least three input terminals, a plurality of output terminals, and a set of at least two transformers each having plural winding portions; the winding portions of one transformer being so related to one another that the voltage induced in each of its winding portions is related to its core flux according to one power law, and the winding portions of another transformer being so related to one another that the voltage induced in each of its winding portions is related to its core flux according to a different power law; conductive paths interconnecting said input terminals and selectively including winding portions of said transformers to provide in the aggregate a number of degrees of freedom equal to the number of said input terminals, and said output terminals being coupled respectively to said conductive paths by other winding portions of said transformers.

15. An interpolating or extrapolating device adapted to receive plural alternating current signals whose amplitudes define numerical values of a function for different values of an argument, and to provide an alternating current output signal whose amplitude represents at least an approximation to the numerical value of said function for other values of said argument, said device comprising at least three input terminals, a plurality of output terminals, and a set of at least two transformers each having individual magnetic circuits and plural winding portions; the winding portions of one transformer being so related to one another that the voltage induced in each of its winding portions is related to its core flux according to one power law, and the winding portions of another transformer being so related to one another that the voltage induced in each of its winding portions is related to its core flux according to a different power law, and conductive paths interconnecting said input terminals and output terminals and selectively including winding portions of said transformers.

16. An interpolating or extrapolating device adapted to receive plural alternating current signals whose amplitudes define numerical values of a function for different values of an argument, and to provide an alternating current output signal whose amplitude represents at least an approximation to the numerical value of said function for other values of said argument, said device comprising at least three input terminals, a plurality of output terminals and a set of at least two transformers each having plural winding portions; the winding portions of one transformer being so related to one another that the voltage induced in each of its winding portions is related to its core flux according to a linear law, and the winding portions of another transformer being so related to one another that the voltage induced in each of its winding portions is related to its core flux according to a quadratic law, and conductive paths interconnecting said input and output terminals and selectively including winding portions of said transformers.

17. An interpolating or extrapolating device comprising at least three input terminals, at least one output terminal, at least two transformers having individual magnetic circuits, paths which are conductive for direct current connecting said input terminals each to said output terminal, said paths selectively including primary and secondary turns of said transformers, and the primary and secondary turns ratios of the respective transformers being predetermined to cause the amplitude of the output signal set up at said output terminal, in response to cophasal alternating electrical signals applied to said input terminals, to represent the ordinate of a point on a curve determined by the transformers and by the amplitudes of the applied signals.

18. An interpolating or extrapolating device comprising at least three input terminals, at least two transformers having individual magnetic circuits, paths which are conductive for direct current interconnecting said input terminals, said paths selectively including primary turns of said transformers to cause the potentials and the potential gradients of said primary turns to be determined in response to alternating electrical signals applied to said input terminals, and an output terminal coupled through secondary turns of both said transformers to said conductive paths, the transformation ratios between the primary and secondary turns of the respective transformers being different and being predetermined to cause the amplitude of the output signal set up at said output terminal to represent the ordinate of a point on a curve determined by the transformers and by the amplitudes of the input signals applied to said input terminals.

19. An interpolating or extrapolating device comprising at least three input terminals, at least two transformers having individual magnetic circuits, conductive paths interconnecting said input terminals, said paths selectively including primary turns of said transformers to cause the potentials and the potential gradients of said primary turns to be determined in response to alternating electrical signals applied to said input terminals, and an output terminal coupled through secondary turns of both said transformers to said conductive paths, the transformation ratio between the primary and secondary turns of one of said transformers being a quadratic function of the transformation ratio between the primary and the secondary turns of the other transformer, to cause the amplitude of the output signal set up at said output terminal to represent the ordinate of one point on a curve determined by said transformers and by the amplitudes of the input signals applied to said input terminals.

20. An interpolating or extrapolating device comprising at least three input terminals, at least two transformers having individual magnetic circuits, conductive paths interconnecting said input terminals, said paths selectively including primary turns of said transformers to cause the potentials and the potential gradients of said primary turns to be determined in response to alternating electrical signals applied to said input terminals, and a series of output terminals, each output terminal being connected selectively through secondary turns of said transformers to said input terminals, the transformation ratios between primary and secondary turns of one of said transformers being a nonlinear function of the transformation ratios between the corresponding primary and secondary turns of the other transformer, to cause the amplitudes of signals set up at said output terminals to represent ordinates of a series of points on a curve determined by said transformers and by the amplitudes of the input signals applied to said input terminals.

References Cited in the file of this patent

"Electrical Analogue Computing—Part 1." (Mynall) Electronic Engineering, June 1947. (Page 179 relied on.)